United States Patent
Spicer

[15] 3,661,382
[45] May 9, 1972

[54] TORSIONALLY SPRING LOADED FEEDER PLATES

[72] Inventor: Gordon M. Spicer, Baltimore, Md.
[73] Assignee: Koppers Company, Inc., Pittsburgh, Pa.
[22] Filed: Oct. 6, 1970
[21] Appl. No.: 78,421

[52] U.S. Cl.............................................................271/44
[51] Int. Cl..................................................B65h 3/24
[58] Field of Search........................271/44, 42, 41, 54, 10

[56] References Cited

UNITED STATES PATENTS

| | | | |
|---|---|---|---|
| 919,927 | 4/1909 | Neumann et al. | 271/44 |
| 2,812,939 | 11/1957 | Harred | 271/44 |
| 1,025,926 | 5/1912 | Runyan | 271/44 X |
| 3,006,276 | 10/1961 | Deslauriers et al. | 271/44 X |

Primary Examiner—Evon C. Blunk
Assistant Examiner—Bruce H. Stoner, Jr.
Attorney—Boyce C. Dent, Oscar B. Brumback and Olin E. Williams

[57] ABSTRACT

An apparatus for sequentially removing sheets from the bottom of a stack with a reciprocating feeder bar including means for pivotally mounting feeder plates at laterally spaced intervals along the bar. Coil springs are used to spring load the feeder plates with respect to the bar and permit relative motion between the plates and the bar without substantial flexing of the plates.

7 Claims, 4 Drawing Figures

PATENTED MAY 9 1972 3,661,382

INVENTOR.
GORDON M. SPICER
BY Boyce C. Dent

TORSIONALLY SPRING LOADED FEEDER PLATES

BACKGROUND OF THE INVENTION

1. Field of the Invention

This invention relates generally to feeding and more particularly to separators of the reciprocating bottom feed type.

2. Description of the Prior Art

During the processing of corrugated board, blank sheets are formed to be made into various sized containers. Stacks of the blank sheets are fed into processing machinery where cutting, scoring and printing operations are usually performed. Generally, the sheets are fed from the bottom of the stacks by a reciprocating feeder bar which has several flexible spring feeder plates mounted laterally along the bar. The feeder plates have a raised lip portion at their trailing edges for engaging the trailing edge of each sheet. The weight of the stack flexes or loads the feeder plates so that varying upward resultant forces are applied to the bottom of the stack by the plates.

Conventional spring feeder plates are secured directly to the feeder bar through a flange so that the plate is mounted in an angular relationship to the bar. Thus, securing of the plate to the bar provides a cantilever spring effect to the feeder plates. As the feeder bar moves rearwardly toward the trailing edge of the stack, the flexing of the feeder plates is partially relieved because the trailing edge of the stack is supported above the feed table by a backstop assembly. When the lip portion of the feeder plates is coincident with the trailing edge of the bottom sheet, the natural tendency of the flexed feeder plate to extend to its unloaded position causes the lip portion to engage the trailing edge of the bottom sheet. Then as the feeder bar moves through its forward stroke the bottom sheet is removed from the underside of the stack and proceeds to the adjacent machinery for processing. The feeder bar reciprocates rapidly and thus the spring feeder plates are constantly flexed beneath the weight of the stack which causes rapid variations in the stresses imposed upon the feeder plates. Such stresses cause eventual fatigue of the plates and frequently the plates crack which makes it necessary to replace them. A similar discussion of fatigue in spring feeder plates appears in Barnes, U.S. Pat. No. 3,409,289. In the Barnes patent the fatigue problem is considerably improved by overlapping the secured portion of the feeder plate with a clamp which results in restricting the stresses to a certain portion of the plate. However, the feeder plates still undergo rapid flexing as they reciprocate beneath the stack of sheets.

The conventional cantilever spring feeder plate deflects in proportion to forces imposed on it by its own static weight and acceleration forces which act on it when the feeder bar moves through its forward stroke. Therefore, the plate never reaches its full height as it attempts to engage each subsequent sheet for feeding. The cantilever spring material is selected to be sufficiently stiff to resist the combined forces of static weight and acceleration, however, sufficient stiffness for these purposes will not permit the plate to deflect to its lowest position unless the weight of the stack is very high. Consequently, warped sheets can be missed on the forward stroke and disturbance or bounce, as it is commonly known, imposed on the stack by the reciprocating feeder bar and the stiff plates is substantially higher than desired.

The foregoing seems to indicate that a means for greatly limiting or substantially eliminating flexing in the feeder plates without sacrificing their desirable feeding characteristics would greatly reduce the costly and frequent replacement of the plates.

SUMMARY OF THE INVENTION

Accordingly, the present invention contemplates a spring feeder apparatus in which feeder plates are secured to a mount which is attached to a feeder bar so that the feeder plates pivot with relation to the bar. Coil springs located in the mount are preferably used to spring load the feeder plates with respect to the feeder bar and thus permit relative motion between the plates and the bar without substantial flexing of the plates.

A beneficial effect of this invention is that the stresses imposed upon the feeder plates due to flexing are transferred to the coil springs. Replacement of feeder plates is thereby greatly reduced and only occasional replacement of the relatively inexpensive coil spring is required if at all.

In addition to a substantial decrease in stress imposed on the feeder plate, the invention has other beneficial features. For instance, the coil springs located in the mount are preloaded. Ideally, the preload should be sufficient to exceed the forces due to the static weight of the feeder plate and acceleration forces acting on the spring feeder. In this manner, the feeder plate may be maintained at its maximum height to engage each subsequent sheet for feeding. The use of a preloaded spring is also advantageous because only a small force from the weight of the stack is required to cause the spring feeder plate to pivot downwardly to its maximum lowered position which is flat against the feeder bar. In this manner, disturbance of the stack of sheets is substantially decreased. Advantageously therefore, the spring feeder plate assembly with a preloaded coil spring will tend to remain in the fully raised position to engage each subsequent sheet for feeding, and will tend to remain in the fully lowered position as it passes beneath the stack.

The above and further objects and novel features of the invention will appear more fully from the following detailed description when the same is read in connection with the accompanying drawings. It is to be expressly understood, however, that the drawings are not intended as a definition of the invention but are for the purpose of illustration only.

BRIEF DESCRIPTION OF THE DRAWINGS

In the drawings wherein like parts are marked alike.

DESCRIPTION OF THE PREFERRED EMBODIMENT

Figure 1:
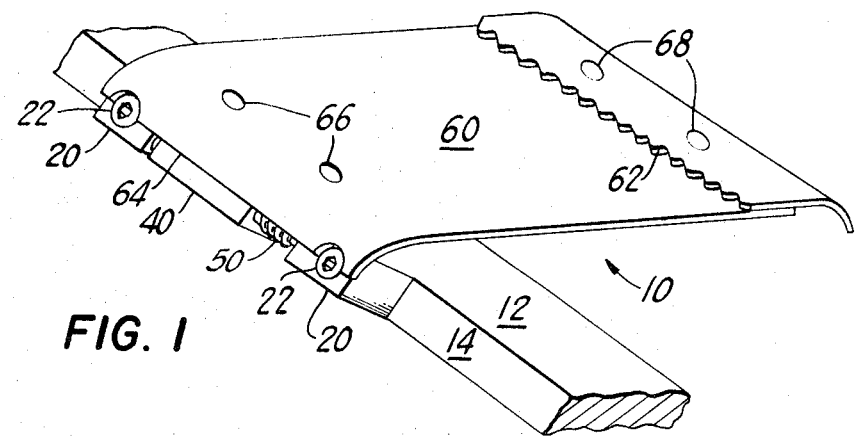
FIG. 1 is a perspective view of the novel feeder plate attached to its mounting on a feeder bar.
Figure 4:
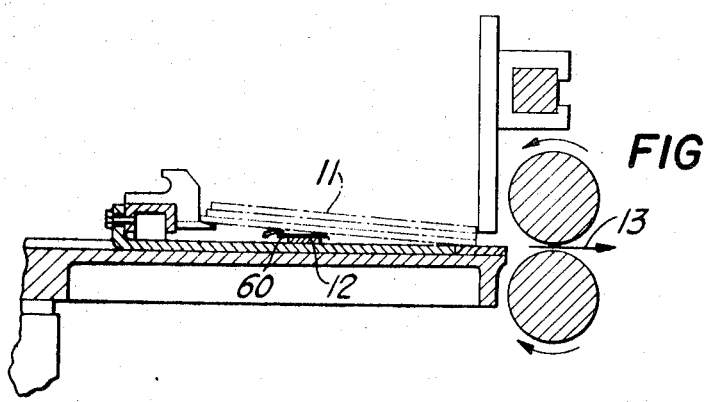
FIG. 4 is a sectional elevational view of a box blank supporting mechanism into which the present invention may be incorporated.

The novel spring feeder assembly is generally designated 10 and FIG. 1 illustrates the feeder plate mounting attached to a feeder bar 12. Feeder plates 60 are mounted to feeder bar 12 which reciprocates beneath stack 11 to sequentially feed sheets along a path of travel indicated by arrow 13 to adjacent processing machinery, see FIG. 4.

Figure 2:
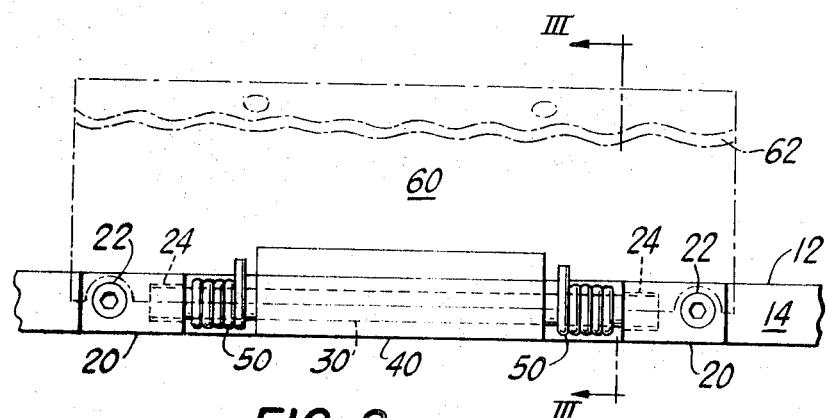
FIG. 2 is a front elevation showing the components of the mounting means and a substantially wide feeder plate in phantom utilizing two coil springs for spring loading.

FIG. 2 shows the components of the mounting including mounting brackets 20, an interconnecting rod 30 pivotally mounted between brackets 20, plate support bracket 40 secured to a portion of rod 30, feeder plate 60 secured to plate support bracket 40 and resilient means such as coil springs 50 adapted to spring load feeder plate 60 with respect to feeder bar 12. Forward edge 14 of feeder bar 12 is provided with laterally spaced pairs of mounting brackets 20 as shown in both FIGS. 1 and 2. Brackets 20 are preferably attached to edge 14 by screws 22. Opposed annular openings 24 in brackets 20 are provided to accommodate interconnecting rod 30 so that rod 30 can freely pivot when it is positioned between brackets 20, see FIG. 2.

Figure 3:
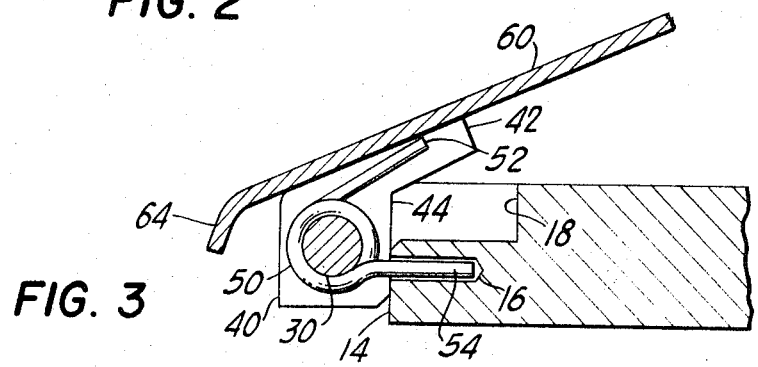
FIG. 3 is a fragmentary side elevation in cross-section taken along line III—III in FIG. 2.

Plate support bracket 40, as shown in FIGS. 2 and 3, is secured to a portion of rod 30 so that both rod 30 and plate support bracket 40 have pivotal movement with respect to bar 12 and mounting brackets 20. FIG. 3 illustrates that cutaway portion 18 of forward edge 14 provides a recess to accommodate flange portion 42 of plate support bracket 40 when bracket 40 is pivoted with respect to bar 12.

Plate support bracket 40 may pivot in the counterclockwise direction to the position shown in FIG. 3. Further counterclockwise pivotal movement, with respect to feeder bar 12, is prevented by the geometry of bracket 40 when edge portion 44 of bracket 40 contacts edge 14 of feeder bar 12.

FIG. 1 shows the novel feeder assembly of this invention using a single torsion spring 50, whereas FIG. 2 shows the use of two coil springs. In some cases either one or two springs may be used to vary the amount of spring loading desired and depending, for example, on the size of the feeder plate 60 to be used. The coil springs, 50 as shown in FIG. 2, encompass portions of rod 30 between mounting brackets 20 and plate support bracket 40. FIG. 3 shows spring 50 in its position relative to rod 30 and having an end 54 secured within opening 16 in bar 12. If desired, end 54 could be secured in bracket 20 instead. End 52 of spring 50 may be secured to flange portion 42 of plate 60 although it is not necessary to secure both ends 52 and 54 of spring 50. With end 54 secured in opening 16 of bar 12, end 52 may rest against plate 60 when plate 60 is attached to plate support bracket 40.

Plate 60 is of generally rectilinear shape and includes a conventional raised lip portion 62, secured to plate 60 such as by rivets 68, which engages the trailing edge of successive bottom sheets of a stack during feeding. The sheets are then sequentially fed along a path of travel to adjacent processing machinery. Preferably, plate 60 includes forward portion 64 which turns downwardly to partially cover plate support bracket 40 as shown in FIGS. 1 and 3. In this manner, plate 60 has no edges or corners which may damage the blank sheets during feeding. Plate 60 is secured to flange portion 42 of plate support bracket 40 as shown in FIG. 3, and may be secured by screws 66 or by welds, whichever is preferable. When plate 60 is secured to plate support bracket 40 the result is that plate 60 is mounted with a pivotal relationship to bar 12. By placing torsion springs 50 along rod 30, securing end 54 of spring 50 in opening 16 of bar 12 and resting or securing end 52 of spring 50 with either plate 60 or bracket 40, the plate 60 is pivotally spring loaded with respect to bar 12.

If desired, the invention may be modified to use a torsion bar spring or leaf spring or other resilient means between the plate 60 and mount 20.

OPERATION

In operation, feeder bar 12 rapidly reciprocates beneath a stack of blanks. Feeder plates 60 are spring loaded with respect to feeder bar 12 and pivotally mounted with respect thereto. Spring loading of plate 60 is provided by torsion springs 50 so that plate 60 may have relative springing motion with respect to bar 12 without substantial flexing of the plates during feeding. A constant upward force is imposed on the underside of the stack so that lip portion 62 of plate 60 may engage the trailing edge of each sequentially exposed blank sheet. Thus, the stresses imposed on heretofore known feeder plates are advantageously transferred to torsion springs 50.

It can be seen from the foregoing that a novel spring feeder assembly can be provided to include the advantageous feeding characteristics of prior feeder assemblies without the disadvantages resulting from stresses due to continuous flexing of the feeder plates.

Having thus described the invention in its best embodiment and mode of operation, that which is desired to be claimed by Letters Patent is:

1. Apparatus for sequentially removing sheets from the bottom of a stack comprising:
   a reciprocating feeder bar;
   mounting means attached at laterally spaced intervals along said bar;
   feeder plates attached to said mounting means in pivotal relationship to said bar; and
   resilient means attached to said mounting means and adapted to spring load said feeder plates with respect to said feeder bar,
   for pivoting said feeder plates into resilient engagement with said sheets,
   said mounting means including:
   a pair of laterally spaced mounting brackets for each of said plates secured to said bar;
   a rod pivotally connected between said mounting brackets; and
   a plate support bracket secured to a portion of said rod for movement therewith, said feeder plate being secured to said plate supporting bracket.

2. The apparatus of claim 1 wherein said resilient means comprises a coil spring encompassing a portion of said rod adjacent said plate support bracket, portions of each of said springs being restrained by said feeder bar and said feeder plate respectively, thereby causing said feeder plate to be spring loaded with respect to said feeder bar.

3. Apparatus for sequentially removing sheets from the bottom of a stack and moving said sheets along a path of travel comprising:
   a feeder bar reciprocable coincidentally with said path of travel;
   mounting means attached to a forward edge portion of said feeder bar;
   feeder plates at spaced lateral intervals along said bar and attached to said mounting means in pivotal relationship to said bar,
   said mounting means including:
   mounting brackets secured to said edge portion,
   an interconnecting rod between said mounting brackets, and
   a plate supporting bracket pivotally engaged with a portion of said rod, said feeder plate secured to said plate supporting bracket; and
   coil springs adapted to spring load said feeder plates with respect to said feeder bar,
   for pivoting said feeder laterally with respect to said feeder bar without substantially flexing said plates.

4. The apparatus of claim 3 wherein said coil springs encompass a portion of said rod adjacent said plate supporting bracket, portions of each of said springs being restrained by said feeder bar and said feeder plates respectively, thereby causing said feeder plate to be spring loaded with respect to said feeder bar.

5. A feeder bar for feeding sheets from the bottom of a stack and along a path of travel and adapted to reciprocate coincidentally with said path of travel of said sheets, said feeder bar including means for mounting feeder plates at laterally spaced intervals therealong, each of said mounting means including mounting brackets secured to said bar, an interconnecting rod between said mounting brackets, and a plate supporting bracket pivotally attached to a portion of said rod for limited relative motion therewith, said feeder plates being fixedly attached to their respective plate supporting brackets and spring loaded with respect to said feeder bar by means of a coil spring, said coil spring encompassing a portion of said rod adjacent said plate supporting bracket, portions of said spring being restrained by said feeder bar and said feeder plate respectively, whereby said feeder plates and said feeder bar have limited relative motion without substantial flexing of said plates.

6. A spring feeder assembly adapted for attachment to a feeding device for removing sheets from the bottom of a stack comprising:
   mounting means attached at laterally spaced intervals along said bar;
   feeder plates attached to said mounting means in pivotal relationship to said bar; and
   coil springs attached to said mounting means and said plates and adapted to spring load said feeder plates with respect to said feeder bar,
   for pivoting said feeder plates about said mounting means,
   said mounting means including:
   a pair of laterally spaced mounting brackets for each of said plates secured to said bar;

a rod pivotally connected between said mounting brackets; and a plate support bracket secured to a portion of said rod for movement therewith, said feeder plate secured to said plate supporting bracket.

7. The apparatus of claim 6 wherein said coil springs encompass a portion of said rod adjacent said plate support bracket, portions of each of said springs being restrained by said feeder bar and said feeder plate respectively, thereby causing said feeder plate to be spring loaded with respect to said feeder bar.

* * * * *